United States Patent
Kang et al.

(10) Patent No.: US 11,714,210 B2
(45) Date of Patent: Aug. 1, 2023

(54) DETERMINING GAS-OIL AND OIL-WATER SHUT-IN INTERFACES FOR AN UNDULATING WELL

(71) Applicant: Landmark Graphics Corporation, Houston, TX (US)

(72) Inventors: Yongfeng Kang, Katy, TX (US);
Adolfo Gonzales, Houston, TX (US);
Robello Samuel, Cypress, TX (US);
Zhengchun Liu, Sugar Land, TX (US);
Nitish Chaudhari, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 124 days.

(21) Appl. No.: 17/314,285

(22) Filed: May 7, 2021

(65) Prior Publication Data
US 2021/0396906 A1 Dec. 23, 2021

Related U.S. Application Data
(60) Provisional application No. 63/042,294, filed on Jun. 22, 2020.

(51) Int. Cl.
*E21B 47/06* (2012.01)
*G01V 9/00* (2006.01)
(Continued)

(52) U.S. Cl.
CPC ............ *G01V 9/005* (2013.01); *E21B 47/047* (2020.05); *E21B 47/06* (2013.01); *E21B 47/07* (2020.05); *E21B 49/0875* (2020.05)

(58) Field of Classification Search
CPC ........ G01V 9/005; G01V 9/00; E21B 47/047; E21B 47/06; E21B 47/07; E21B 49/0875;
(Continued)

(56) References Cited

U.S. PATENT DOCUMENTS

| | | | |
|---|---|---|---|
| 5,960,369 A | * | 9/1999 | Samaroo ................ E21B 49/00 702/6 |
| 6,464,021 B1 | | 10/2002 | Edwards |
| 9,194,220 B2 | | 11/2015 | Gill et al. |

FOREIGN PATENT DOCUMENTS

| | | | | |
|---|---|---|---|---|
| CN | 104463345 | | 3/2015 | |
| CN | 104463345 A | * | 3/2015 | ............. G06Q 10/04 |

(Continued)

OTHER PUBLICATIONS

Halliburton Energy Services, Inc., "NETool Software Product Sheet", Nov. 2019, 2 pages.

(Continued)

*Primary Examiner* — Tarun Sinha
*Assistant Examiner* — James I Burris
(74) *Attorney, Agent, or Firm* — Kilpatrick Townsend & Stockton LLP

(57) ABSTRACT

A system can determine a temperature profile based on a prior production temperature profile and a reference start point pressure for a well. The system can virtually divide the well into a plurality of sections including uphill sections and downhill sections. The system can determine a gas-oil interface depth for each section of the plurality of sections from a water-oil ratio and a gas-oil ratio based on the temperature profile and the reference start point pressure. The system can determine an oil-water interface depth for each section of the plurality of sections from the gas-oil ratio and the water-oil ratio based on the temperature profile and the reference start point pressure.

20 Claims, 6 Drawing Sheets

(51) Int. Cl.
    *E21B 49/08*     (2006.01)
    *E21B 47/047*     (2012.01)
    *E21B 47/07*     (2012.01)

(58) Field of Classification Search
    CPC ...... E21B 49/08; E21B 41/00; E21B 2200/20; E21B 47/04
    See application file for complete search history.

(56) References Cited

FOREIGN PATENT DOCUMENTS

| | | | |
|---|---|---|---|
| CN | 105550773 | 5/2016 | |
| CN | 105550773 A * | 5/2016 | ............. E21B 49/00 |
| JP | 2014051856 | 3/2014 | |
| KR | 20180062301 | 6/2018 | |
| WO | 2015065623 | 5/2015 | |

OTHER PUBLICATIONS

Kamkom et al., "Predicting Undulating-Well Performance", Society of Petroleum Engineers, 2009, 14 pages.
Landmark Graphics Corporation, "Wellcat Software Product Sheet", 2015, 8 pages.
Prosper, "Multiphase Well and Pipeline Nodal Analysis", 2015, 4 pages.
Schlumberger, "OLGA Online", 2019, 3 pages.
Schlumberger, "Pipeism 2017", Steady-State Multiphase Flow Stimulator, Jan. 2018, 28 pages.
International Patent Application No. PCT/US2021/031489, International Search Report and Written Opinion dated Sep. 1, 2021, 10 pages.
GB Application No. GB2106689.9 , "Search Report", dated Oct. 18, 2021, 4 pages.

\* cited by examiner

DETERMINING GAS-OIL AND OIL-WATER SHUT-IN INTERFACES FOR AN UNDULATING WELL

CROSS REFERENCE TO RELATED APPLICATION

This application claims priority to U.S. Provisional Application No. 63/042,294, titled "Determining Gas-Oil and Oil-Water Shut-in Interfaces for an Undulating Well" and filed Jun. 22, 2020, the entirety of which is incorporated herein by reference.

TECHNICAL FIELD

The present disclosure relates generally to wellbore production operations and, more particularly (although not necessarily exclusively), to determining gas, oil, or water interfaces in a wellbore.

BACKGROUND

In hydrocarbon exploration, a well can include a wellbore drilled through a subterranean formation. Well trajectories continue to become more and more complicated, and an undulating well can be used to provide better well performance and production. An undulating well can include a well that is not completely horizontal and includes at least one section whose true vertical depth (TVD) decreases with the increasing measured depth (MD) of the well. Additionally, the profile of a reservoir in the subterranean formation may involve such a well trajectory.

DETAILED DESCRIPTION

Certain aspects and examples of the present disclosure relate to determining gas-oil and oil-water shut-in interfaces for an undulating well. In some examples, the undulating well can have at least one inclining portion and at least one declining portion. When the well is shut-in, the gas, oil, or water can settle and result in multiple gas-oil interfaces and oil-water interfaces at various depths. For example, the gas, oil, or water (or some combination thereof) can settle in the inflection point between a declining portion and an inclining portion of the well. A gas-oil interface can include a boundary between oil and gas in a well and an oil-water interface can include a boundary between oil and water in a well.

Some examples of the present disclosure can include a computing system that can determine the oil-gas interfaces and the oil-water shut-in interfaces after a shut-in operation. A shut-in operation can include closing off the well so that the well can stop producing oil, water, or gas. For example, the computing system can divide the well into uphill and downhill sections and use a known gas-oil ratio and a known water-oil ratio to determine the shut-in interfaces.

In some examples, the computing system can use a temperature profile of a production operation performed prior to a shut-in operation in the well, and pressure information from the well to perform iterative trial-and-error and nodal analysis operations to determine the gas-oil interface depths and the oil-water interface depths. The interface depths can provide information to a user about a tubing specification for the wellbore operation or about where to install pumps and other production enhancement devices. Such devices can be installed at depths that are submerged in a liquid phase to avoid issues with restarting the pumps.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
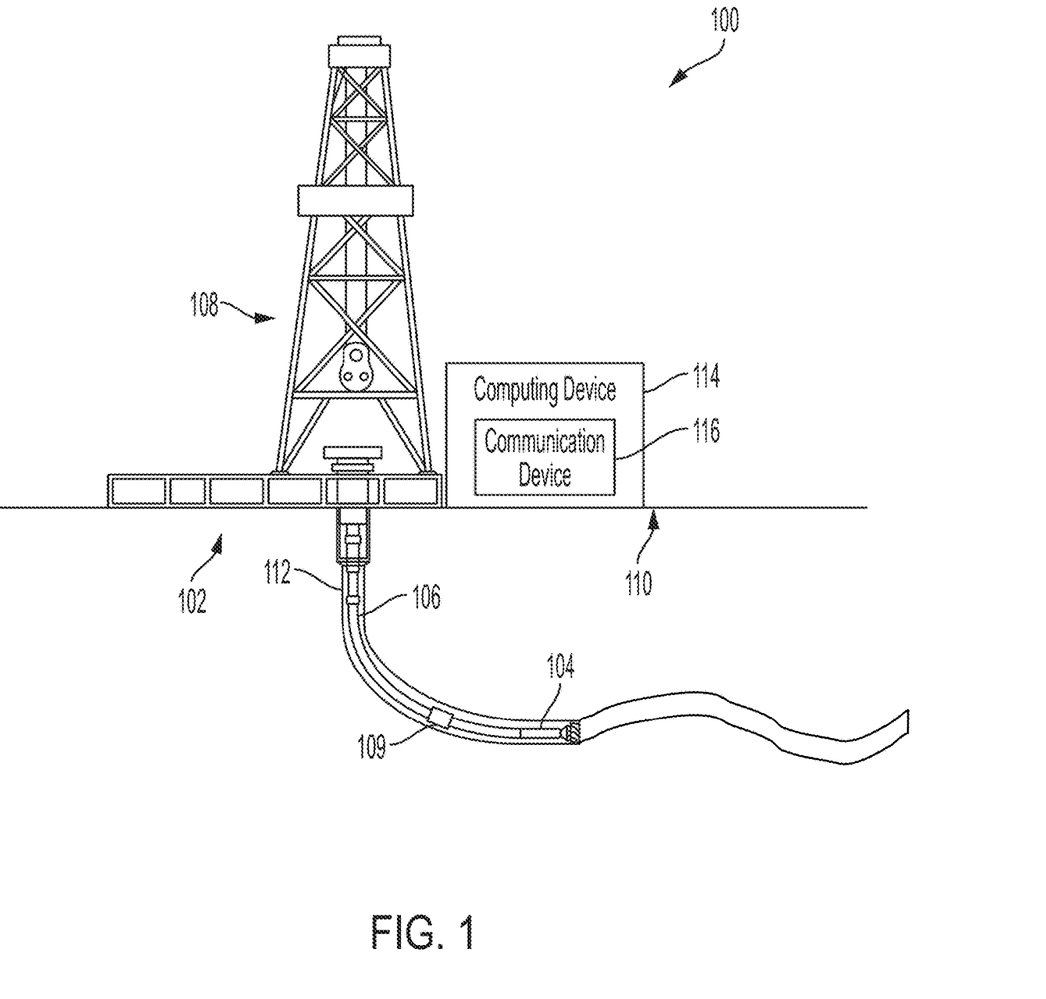
FIG. 1 is a cross-sectional view of an undulating well system in a production phase according to one example of the present disclosure.

FIG. 1 is a cross-sectional view of an undulating well system 100 in a production phase according to one example of the present disclosure. The system 100 can calculate gas-oil and oil-water shut-in interfaces for the undulating well.

A wellbore 112 used to extract hydrocarbons may be created by drilling into a subterranean formation 102. The wellbore 112 may be drilled using a drill string 106 with a bottom hole assembly 104 positioned or otherwise arranged at the bottom of the drill string 106. The drill string 106 can extend into the subterranean formation 102 from a derrick 108 arranged at the surface 110. The drill string may include one or more sensors 109 for determining conditions in the wellbore 112. During a production phase, the sensors 109 may be positioned along a casing that extends within the wellbore 112. Sensors 109 may be positioned on drilling equipment and sense values of drilling or production parameters for drilling or production operations. The sensors can send signals to the surface 110 via a wired or wireless connection, and the sensors may send real-time data relating to the drilling or production operations to the surface 110. The wellbore 112 may be drilled to include uphill and downhill sections. Water, gas, and oil may settle in the inflection points between the uphill and downhill sections.

The drilling equipment and any sensors can be connected to a computing device 114. The computing device 114 can be permanently installed with the derrick 108, be hand-held, or be remotely located. Although one computing device 114 is depicted in FIG. 1, in other examples, more than one computing device can be used, and together, the multiple computing devices can perform operations, such as those described in the present disclosure.

The computing device 114 can include a communication device 116. The communication device 116 can represent one or more of any components that facilitate a network connection. In the example shown in FIG. 1, the communication devices 116 are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices 116 can use acoustic waves, surface waves, vibrations, optical waves, or induction (e.g., magnetic induction) for engaging in wireless communications. In other examples, the communication device 116 can be wired and can include interfaces such as Ethernet, USB, IEEE 1394, or a fiber optic interface. In an example with at least one other computing device, the computing device 114 can receive wired or wireless communications from the other computing device and perform one or more tasks based on the communications. For example, the computing device 114 can be used to calculate the gas-oil and oil-water settling interfaces of a shut-in operation in an undulating well to install pumps or other production enhancement devices where they can be submerged in liquid phase.

Figure 2:
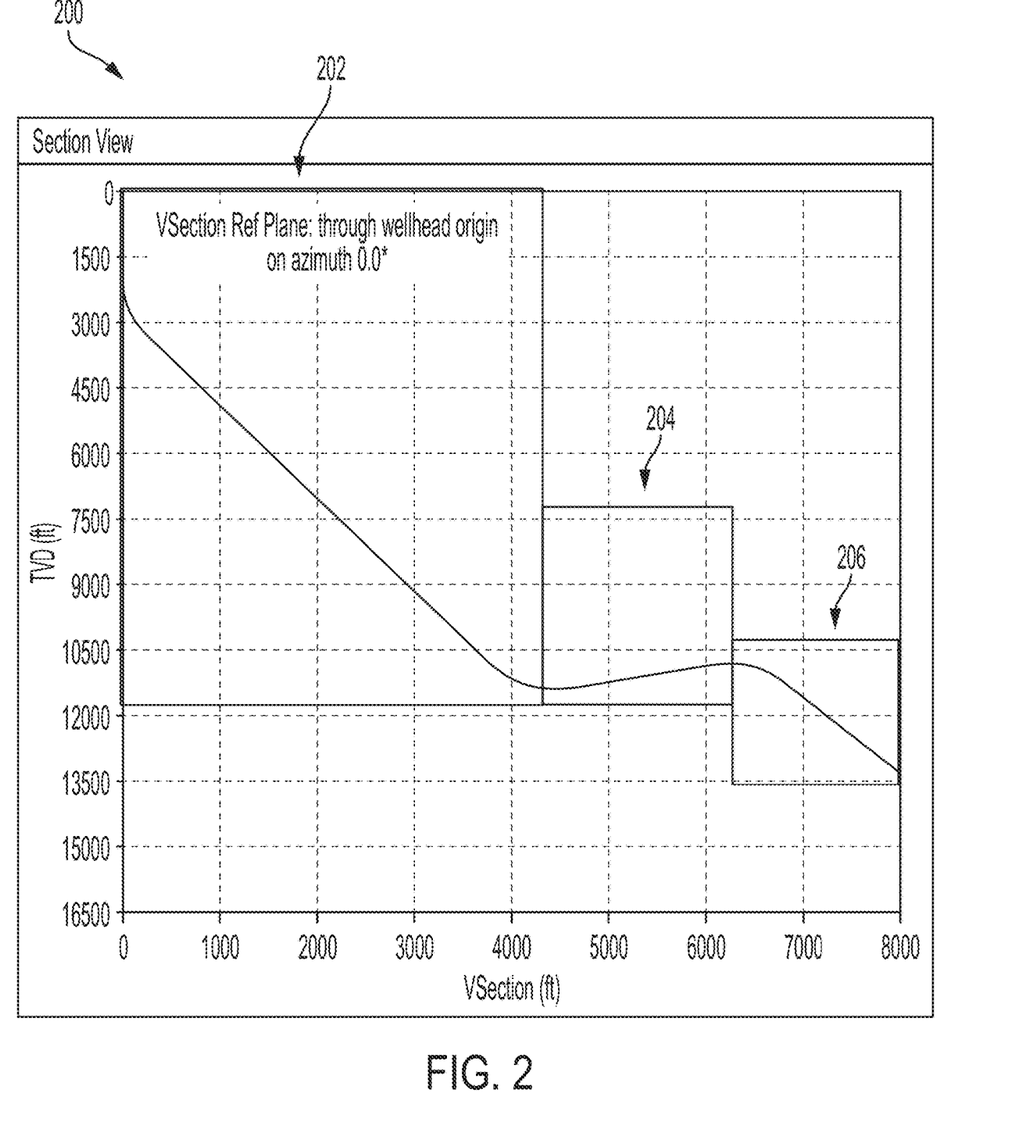
FIG. 2 is a graph of an undulating well according to one example of the present disclosure.

FIG. 2 is a graph 200 of an undulating well according to one example of the present disclosure. The graph 200 shows the true vertical depth (TVD) of the well versus the horizontal departure of a vertical section view of the well. In some examples, a computing system can virtually divide the well into different sections. For each section, the well path can be downhill or uphill. For example, the TVD of the well is increasing or not increasing (for horizontal well part) with respect to the increasing measured depth (MD) for a downhill section. Alternatively, the TVD is decreasing or not decreasing (for horizontal well part) with respect to the increasing MD for an uphill section.

The computing system can divide the well in the graph 200 into three sections indicated by the three boxes: a first downhill section 202, a first uphill section 204, and a second downhill section 206. The computing system can use a known gas-oil ratio and a known water-oil ratio for each section to calculate the gas-oil interface and oil-water interface in that section based on a prior production temperature profile and a reference start point pressure for the well. During computation of the shut-in interfaces, the computing system can set the pressure to be continuous at each turning point between the sections. The reference start point pressure can be provided from the surface or at the bottom of the well. If the reference start point pressure is provided at the surface, the computing system can perform the gas-oil interface and oil-water interface calculation from the surface to the bottom section-by-section. If the reference start point pressure is provided at the bottom, the computing system can perform the calculation from the bottom to the surface section-by-section.

Figure 3:
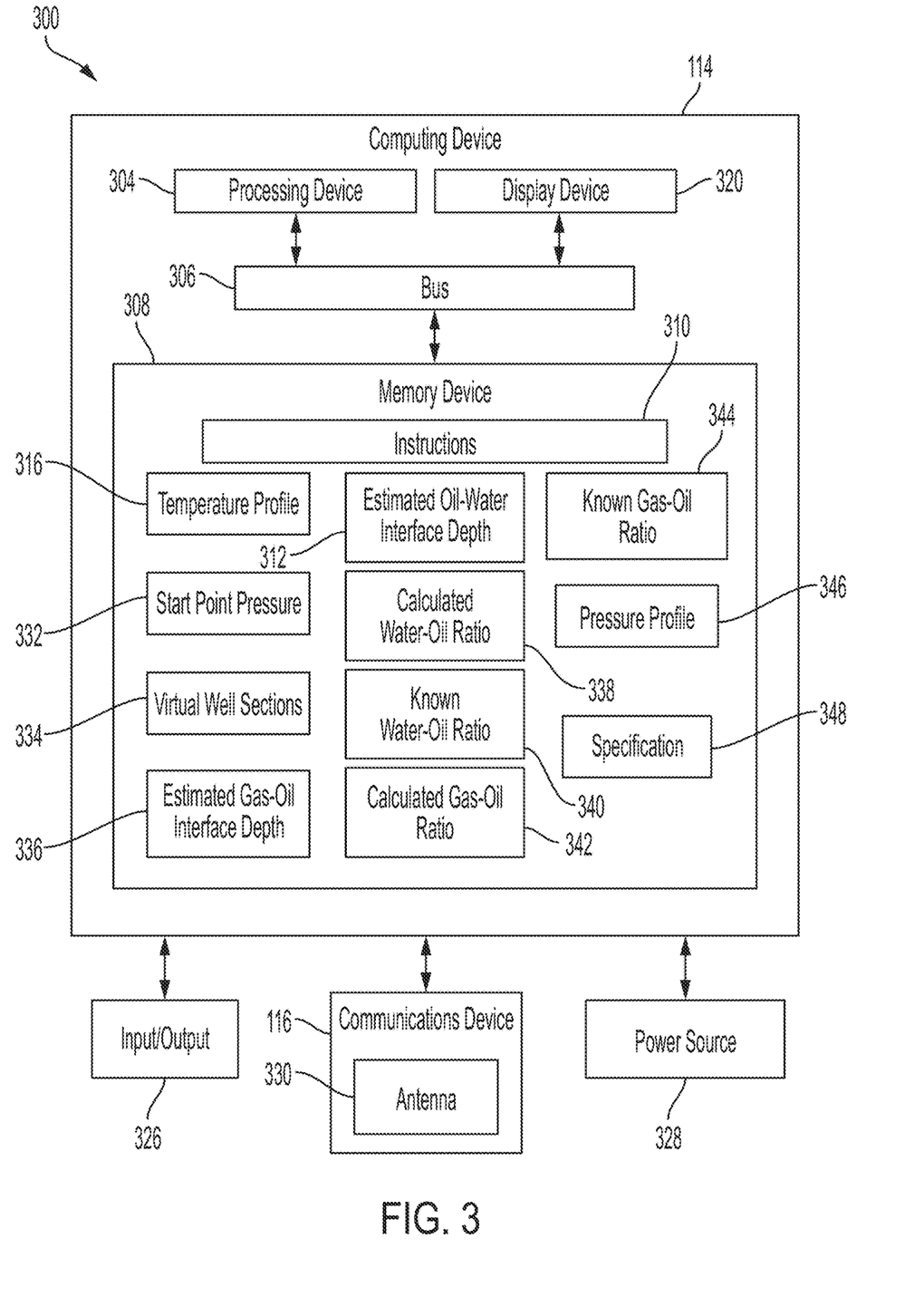
FIG. 3 is a block diagram of a computing system for determining interfaces in an undulating well according to one example of the present disclosure.

FIG. 3 is a block diagram of a computing system 300 for determining interfaces in an undulating well according to one example of the present disclosure. The computing system 300 can include a computing device 114. The computing device 114 can include a processing device 304 interfaced with other hardware via a bus 306. A memory device 308, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 114. In some examples, the computing device 114 can be communicatively connected to input/output interface components 326 (e.g., a printer, keyboard, touch-sensitive surface, and mouse) and additional storage. The computing device 114 can include a display device 320. The computing device 114 can be communicatively connected to a communications device 116 which can include an antenna 330.

The computing device 114 can be in electrical communication with a power source 328. In some examples, the power source 328 can include a battery or an electrical cable (e.g., a wireline). In some examples, the power source 328 can include an AC signal generator. The computing device 114 can operate the power source 328 to apply a transmission signal to the antenna 330 to forward data relating to shut-in interfaces, drilling operations, production operations, etc. to other systems. For example, the computing device 114 can cause the power source 328 to apply a voltage with a frequency within a specific frequency range to the antenna 330. This can cause the antenna 330 to generate a wireless transmission. In other examples, the computing device 114, rather than the power source 328, can apply the transmission signal to the antenna 330 for generating the wireless transmission.

In some examples, part of the communications device 116 can be implemented in software. For example, the communications device 116 can include additional instructions 310 stored in the memory device 308 for controlling functions of the communications device 116. The communications device 116 can receive signals from remote devices and transmit data to remote devices. For example, the communications device 116 can transmit wireless communications that are modulated by data via the antenna 330.

The processing device 304 can be communicatively coupled to the memory device 308 via the bus 306. The non-volatile memory device may include any type of memory device that retains stored information when powered off. Non-limiting examples of the memory device 308 include EEPROM, flash memory, or any other type of non-volatile memory. In some examples, at least part of the memory device 308 can include a medium from which the processing device 304 can read instructions. A computer-readable medium can include electronic, optical, magnetic, or other storage devices capable of providing the processing device 304 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory device 308 can include instructions 310 for calculating shut-in interfaces and outputting a display for monitoring the shut-in interfaces of the well. Information indicating the shut-in interfaces can be stored in the memory device 308. The memory device 308 can include a temperature profile 316 of the well based on a prior production temperature profile and a reference start point pressure 332. The processing device 304 divide the well into virtual well sections 334. The virtual well sections 334 can include uphill and downhill sections. The processing device 304 can determine an estimated gas-oil interface depth 336 and an estimated oil-water interface depth 312 for each virtual well section 334 based on the prior production temperature profile and the reference start point pressure 332. The method of determination of interfaces by the processing device 304 can depend on whether the reference start point pressure 332 is provided at the top or the bottom of the virtual well section 334. The "top" of a virtual well section 334 can be located at a shallower TVD depth location and the "bottom" of a virtual well section 334 can be located at a deeper TVD depth location.

When the reference start point pressure 332 of a virtual well section 334 is provided at the top of the virtual well section 334, the processing device 304 can determine an estimated gas-oil interface depth 336. The processing device 304 can determine a mass of the gas in the virtual well section 334 using the prior production temperature profile, an updated pressure profile with estimated interfaces, and the reference start point pressure 332. The processing device 304 can determine an estimated oil-water interface depth 312, and can use the estimated oil-water interface depth 312 to determine a mass of the oil in the virtual well section 334. The processing device 304 can determine a calculated gas-oil ratio 342 by dividing a calculated volume at surface separator condition from the mass of the gas by a calculated volume at surface separator condition from the mass of the oil in the virtual well section 334. Surface separator condition can be the standard condition of wellbore fluids located in a separator on a surface of the wellbore. If the calculated gas-oil ratio 342 does not match a known gas-oil ratio 344, the processing device 304 can adjust the estimated oil-water interface depth 312 and iterate the calculation until the calculated gas-oil ratio 342 and the known gas-oil ratio 344 match. The estimated oil-water interface depth 312 can be adjusted to increase the water interval length if the calculated gas-oil ratio 342 is larger than the known gas-oil ratio 344, and decrease the water interval length if the calculated gas-oil ratio 342 is smaller than the known gas-oil ratio 344. The pressure profile 346 can be updated with a newly calculated start point pressure 332 every time the estimated gas-oil interface depth 336 or estimated oil-water interface depth 312 is adjusted.

After an accurate estimated oil-water interface depth 312 is determined, the processing device 304 can use the estimated oil-water interface depth 312 to determine a mass of the water in the virtual well section 334. The processing device 304 can determine a calculated water-oil ratio 338 by dividing the calculated volume at surface separator condition from the mass of the water by the calculated volume at surface separator condition from the mass of the oil in the virtual well section 334. If the calculated water-oil ratio 338 does not match a known water-oil ratio 340, the processing device 304 can adjust the estimated gas-oil interface depth 336 and iterate the calculation until the calculated water-oil ratio 338 and the known water-oil ratio 340 match. The estimated gas-oil interface depth 336 can be adjusted to increase the liquid phase oil interval length if the calculated water-oil ratio 338 is larger than the known water-oil ratio 340, and decrease if the calculated water-oil ratio 338 is smaller than the known water-oil ratio 340, while keeping the estimated oil-water interface depth 312 the same when adjusting the estimated gas-oil interface depth 336. The pressure profile 346 can be updated with the a newly calculated start point pressure 332 every time the estimated gas-oil interface depth 336 or estimated oil-water interface depth 312 is adjusted.

Alternatively, when the reference start point pressure 332 of a virtual well section 334 is provided at the bottom of a virtual well section 334, the processing device 304 can determine an estimated oil-water interface depth 312. The processing device 304 can determine a mass of the oil in the virtual well section 334 using the prior production temperature profile and the updated pressure profile 346 with estimated interfaces and reference start point pressure 332. The processing device 304 can determine an estimated gas-oil interface depth 336, and can use the estimated gas-oil interface depth 336 to determine a mass of the oil in the virtual well section 334. The processing device 304 can determine a calculated water-oil ratio 338 by dividing the calculated volume at surface separator condition from the mass of the water by the calculated volume at surface separator condition from the mass of the oil in the virtual well section 334. If the calculated water-oil ratio 338 does not match a known water-oil ratio 340, the processing device 304 can adjust the estimated gas-oil interface depth 336 and iterate the steps in this paragraph until the calculated water-oil ratio 338 and the known water-oil ratio 340 match. The estimated gas-oil interface depth 336 can be adjusted to increase the liquid phase oil interval length if the calculated water-oil ratio 338 is larger than the known water-oil ratio 340, and decrease if the calculated water-oil ratio 338 is smaller than the known water-oil ratio 340, while keeping the estimated oil-water interface depth 312 the same when adjusting the estimated gas-oil interface depth 336. The pressure profile 346 can be updated with the newly calculated start point pressure 332 every time the estimated gas-oil interface depth 336 or estimated oil-water interface depth 312 is adjusted.

After an accurate estimated gas-oil interface depth 336 is determined, the processing device 304 can use the estimated gas-oil interface depth 336 to determine a mass of the dissolved gas in the virtual well section 334. The processing device 304 can determine a calculated gas-oil ratio 342 by dividing the calculated volume at surface separator condition from the mass of the gas by the calculated volume at surface separator condition from the mass of the oil in the virtual well section 334. If the calculated gas-oil ratio 342 does not match a known gas-oil ratio 344, the processing device 304 can adjust the estimated oil-water interface depth 312 and iterate the steps in this paragraph until the calculated gas-oil ratio 342 and the known gas-oil ratio 344 match. Similarly, the estimated oil-water interface depth 312 can be adjusted to increase the water interval length if the calculated gas-oil ratio 342 is larger than the known gas-oil ratio 344, and decrease if the calculated gas-oil ratio 342 is smaller than the known gas-oil ratio 344. The pressure profile 346 can be updated with the newly calculated start point pressure 332 every time the estimated gas-oil interface depth 336 or estimated oil-water interface depth 312 is adjusted.

The processing device 304 can repeat the above methods for each of the virtual well sections 334. After the interfaces have been determined for each section of the well, the processing device 304 can determine a pressure profile 346 for the well using the interface depths. The processing device 304 can determine a specification 348 for the well that comprises a tubing specification or a positioning of a pump in the well for a wellbore operation. The above methods can may be used for gas-oil-water production, a gas-oil production, an oil-water production, or a gas-water production with some modification.

In some examples, the components of the computing system 300 can be integrated into a single structure. For examples, the components can be within a single housing. In other examples, the components of the computing system 300 can be distributed (e.g., in separate housings) and in electrical communication with each other.

Figure 4:
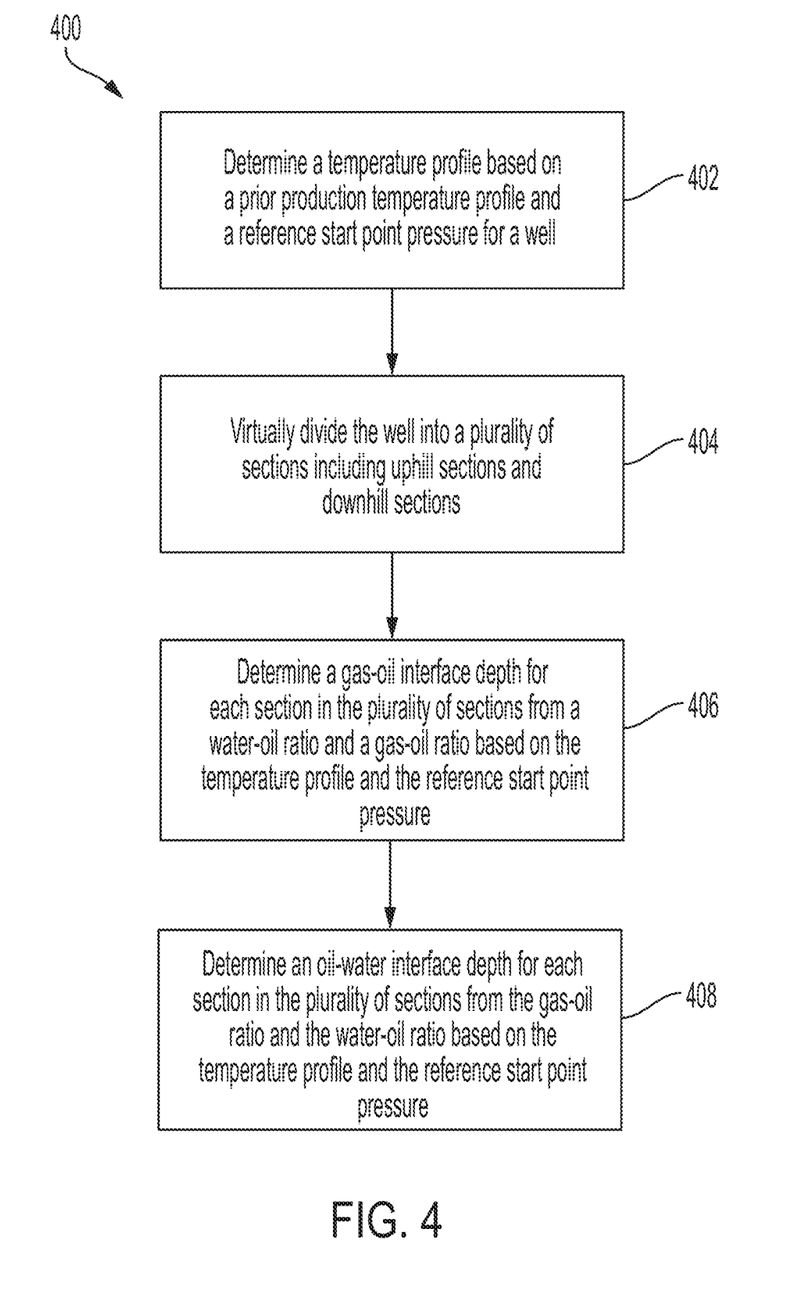
FIG. 4 is a flowchart of a process for determining interfaces in an undulating well according to one example of the present disclosure.

FIG. 4 is a flowchart of a process 400 for determining interfaces in an undulating well according to one example of the present disclosure. The process 400 may be performed by a computing device, such as computing device 114.

In block 402, the computing device can determine a temperature profile based on a prior production temperature profile and a reference start point pressure for the well. The temperature profile can be from a prior production operation and can remain unchanged during the process 400. The reference start point pressure can be known from the wellhead surface pressure or from the reservoir pressure, but the pressure profile may change in the calculation process.

In block 404, the computing device can virtually divide the undulating well into sections, including uphill sections and downhill sections. There can be one or more uphill or downhill sections based on the trajectory of the well. The gas-oil and oil-water interfaces of the well can be calculated in each section using the reference start point pressure and production temperature profile.

In block 406, the computing device can determine a gas-oil interface depth for each section of the well from a water-oil ratio and a gas-oil ratio based on the temperature profile and the reference start point pressure of the well. The calculation for the gas-oil interface depth can originate from the point where the reference start point pressure is given. For example, if the reference start point pressure is given at the wellhead surface, the calculation can be performed from the wellhead down to the bottom, section-by-section. Alternatively, if the reference start point pressure is given at the bottom of the reservoir, the calculation can be performed from the bottom up to the top of the wellhead, section-by-section. The gas-oil-water interfaces settling can be assumed to be instantaneous.

In block 408, the computing device determines an oil-water interface depth for each section of the well from a gas-oil ratio and a water-oil ratio based on the temperature profile and the reference start point pressure of the well. As in block 406, the calculation for the oil-water interface depth can originate from the point where the pressure is given. The gas-oil interface depths and the oil-water interface depths can be used to calculate the pressure profile so as to perform stress analysis tests of drill strings, casing strings, and tubing in the wellbore. The interface depths can also be used to determine installation depth for devices, such as an artificial lift device or an electric submersible pump.

Figure 5A:
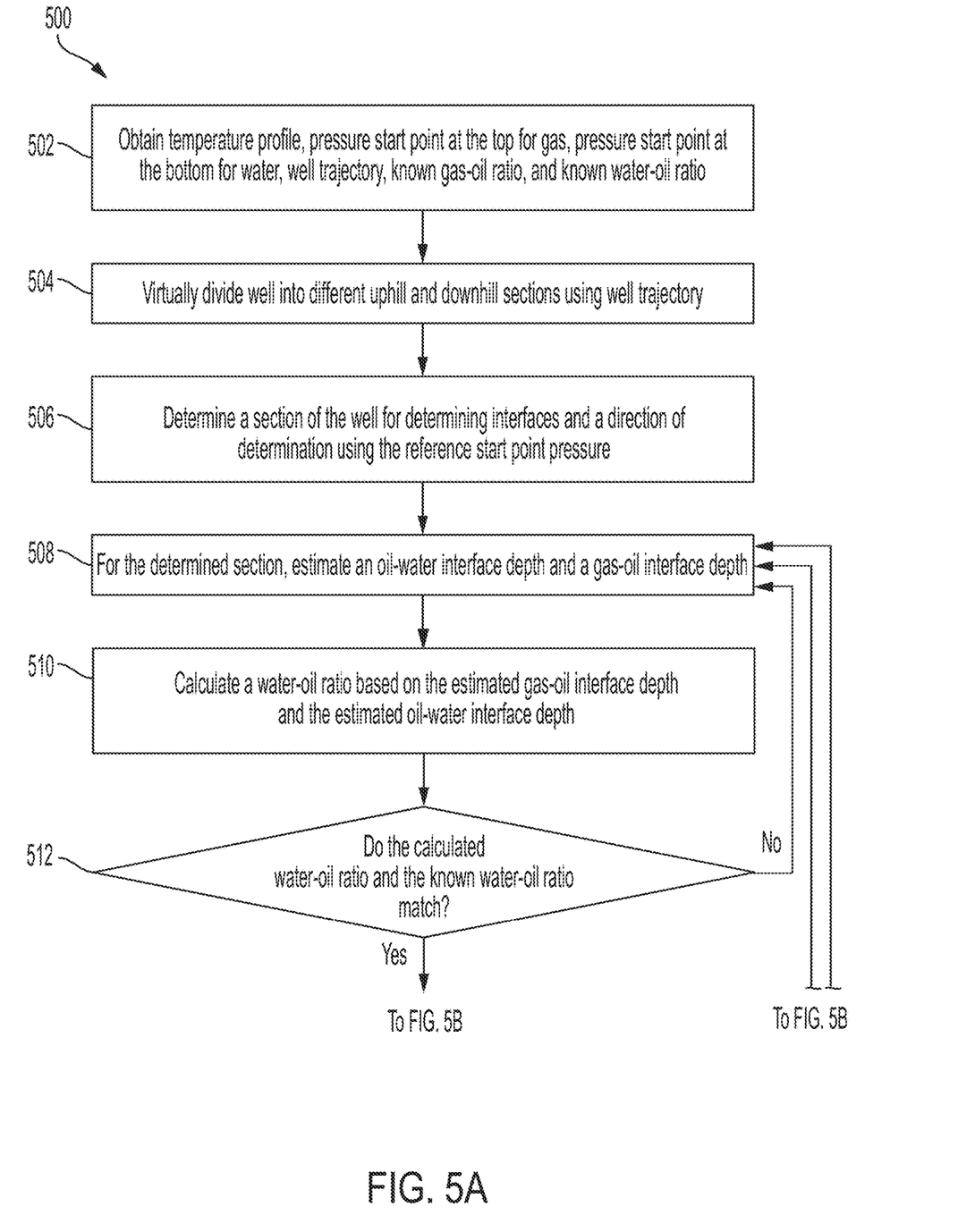
FIGS. 5A-5B is another flowchart of a process for determining interfaces in an undulating well according to one example of the present disclosure.
Figure 5B:
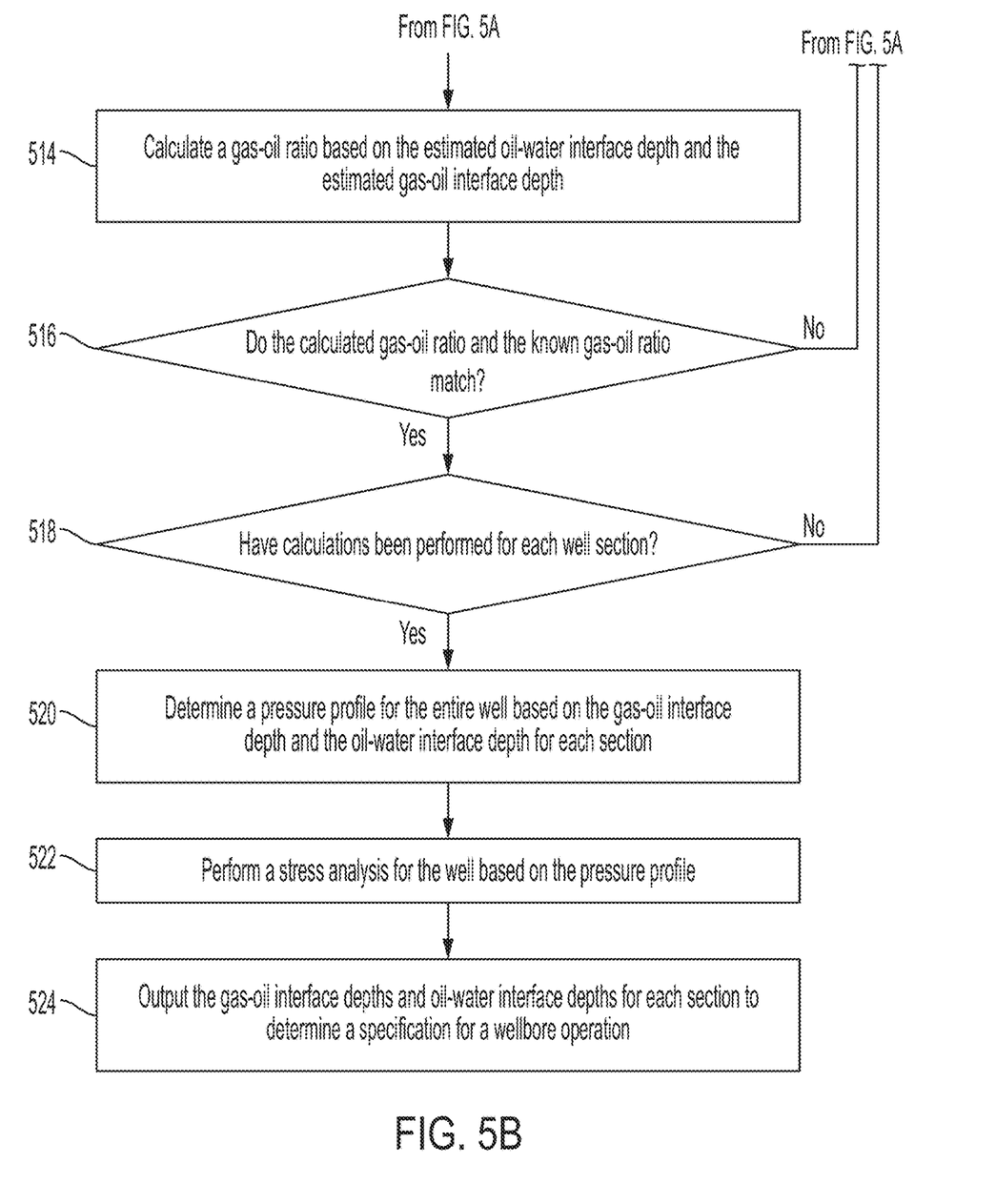

FIG. 5 is another flowchart of a process 500 for determining interfaces in an undulating well according to one example of the present disclosure. In block 502, a computing device obtains wellbore information such as a temperature profile, a pressure start point at the top of the wellbore, or a pressure start point at the bottom of the wellbore, a well trajectory of the wellbore, a known gas-oil ratio, and a known water-oil ratio. The temperature profile can be obtained from an operation performed prior to a shut-in operation, and the temperature does not change during an instant settling process.

In block 504, the computing device can analyze the well trajectory to virtually divide the well into different uphill and downhill sections. For example, the computing device can determine sections of the well which include a constant or increasing TVD with respect to the MD to be downhill well sections and sections of the well which include constant or decreasing TVD with respect to the MD to be uphill sections.

In block 506, the computing device can determine a section to begin the determination of interfaces using the point where the reference start point pressure is given. In some examples where the reference start point pressure is given at the wellhead, the computing system can determine interfaces of sections starting from the wellhead down to the bottom, section-by-section. Alternatively, if the reference start point pressure is given at the bottom of the well, the interface determinations can start from the bottom up to the wellhead, section-by-section. When the reference start point pressure is given at the top of the gas, which applies to the calculation of downhill sections with pressure given at MD "top" of the section, or uphill sections with pressure given at MD "bottom" of the section (shallower TVD depth of the section), the computing system can perform the calculation from the gas phase to the bottom of the water. The pressure at each connecting point of the sections can be the same, so the pressure can be continuous along the well path. The pressure profile can be changed during the shut-in operation since the fluid is settled and the pressure profile can be calculated with the new gas-oil and oil-water interfaces. In this example, the pressure is given at the bottom of the water.

In block 508, the computing device can estimate an oil-water interface depth and a gas-oil interface depth for the determined section. The estimations can be used in a calculation of a gas-oil ratio, and may be adjusted upon determining the calculated gas-oil ratio does not match the known gas-oil ratio. Each time an oil-water or gas-oil interface depth is adjusted, the computing device can update a pressure profile that includes the pressures for each section of the wellbore using the adjusted oil-water interface depth or adjusted gas-oil interface depth.

In block 510, the computing device can calculate the water-oil ratio based on the estimated gas-oil interface depth and the estimated oil-water interface depth. The oil-water interface depth can be used to determine a mass of water. The computing device can use the mass of water to calculate the water-oil ratio by dividing the calculated volume at surface separator condition from the total mass of water by the calculated volume at surface separator condition from the mass of oil.

In block 512, the computing device can compare the calculated water-oil ratio and the known water-oil ratio to determine if they match. If the calculated water-oil ratio and the known water-oil ratio do not match, the process 500 is routed back to block 508 and the computing device can estimate a different gas-oil interface depth. If the calculated water-oil ratio is larger than the known water-oil ratio, the gas-oil interface depth can be adjusted to increase the liquid phase oil interval length. If the calculated water-oil ratio is smaller than the known water-oil ratio, the gas-oil interface depth can be adjusted to decrease the liquid phase oil interval length while keeping the oil-water interface depth the same when adjusting the gas-oil interface depth. The liquid phase oil interval length can be a length of the section that is occupied by liquid-phase oil. The computing device can iterate these steps until the ratios match. The pressure can be updated with the given pressure start point every time the gas-oil interface and oil-water interface is adjusted. The computing device can perform any suitable numerical optimization method to reduce computation time of the calculation. If the water-oil ratios match, the process 500 continues to block 514.

In block 514, the computing device calculates the gas-oil ratio based on the estimated oil-water interface depth and the estimated gas-oil interface depth. The computing device can calculate a gas mass of the dissolved gas in the oil and the gas mass in gas phase using the estimated interface depths to determine a total mass of gas. The computing system can then calculate the gas-oil ratio by dividing the calculated volume at surface separator condition from the total mass of gas by the calculated volume at surface separator condition from the mass of oil.

In block 516, the computing device can compare the calculated gas-oil ratio and the known gas-oil ratio to determine if they match. If the calculated gas-oil ratio and the known gas-oil ratio do not match, the process 500 is routed back to block 508, and the computing device can estimate a different oil-water interface depth. If the calculated gas-oil ratio is larger than the known gas-oil ratio, the oil-water interface depth can be adjusted to increase the water interval length. If the calculated gas-oil ratio is larger than the known gas-oil ratio, the oil-water interface depth can be adjusted to decrease the water interval length. The water interval length can be a length of the section that is occupied by water. The pressure can be updated with the given pressure start point every time the gas-oil interface and oil-water interface is adjusted. The computing device can iterate these steps until the ratios match. The computing device can perform any suitable numerical optimization method to reduce computation time of the calculation. If the calculated gas-oil ratio and the known gas-oil ratio also match, in addition to the calculated water-oil ratio matching the known water-oil ratio, the process 500 continues to block 518.

In block 518, the computing device determines if interface calculations have been performed for each section of the well. If calculations have not been performed for each section of the well, the process 500 routes back to block 508 to perform interface calculations for the next neighboring section of the well. If calculations have been performed for all sections, the process 500 continues to block 520.

In block 520, the computing device determines a pressure profile for the entire well based on the final gas-oil interface depth and oil-water interface depth of each section of the well.

In block 522, the computing device can use the temperature and pressure profiles to perform a stress analysis test for accurate tubular design and well design. For example, the computing device may determine a tubing specification for a well design based on the stress analysis.

In block 524, some or all of the calculations (including the gas-oil interface depths, oil-water interface depths, pressure profile, and temperature profile) for each section may be outputted to a user to determine a specification for a wellbore operation. The user may use the calculations to determine where to place pumps or other equipment so that they are submerged in the liquid phase. Alternatively, the output may include a recommendation of the specification for the wellbore operation.

In some aspects, systems, methods, and non-transitory computer-readable mediums for determining interfaces are provided according to one or more of the following examples:

EXAMPLE #1

A system can include a processing device and a memory device. The memory device can include instructions executable by the processing device for causing the processing device to perform operations. The operations can include determining a temperature profile based on a prior production temperature profile and a reference start point pressure for a well. The operations can include virtually dividing the well into a plurality of sections including uphill sections and downhill sections. The operations can include determining a gas-oil interface depth for each section of the plurality of sections from a water-oil ratio and a gas-oil ratio based on the temperature profile and the reference start point pressure. The operations can include determining an oil-water interface depth for each section of the plurality of sections from the gas-oil ratio and the water-oil ratio based on the temperature profile and the reference start point pressure.

EXAMPLE #2

The system of Example #1 may feature the memory further including instructions executable by the processing device for causing the processing device to perform operations. The operations can include outputting the gas-oil interface depth for each section and the oil-water interface depth for each section to determine a specification for a wellbore operation. The operations can include outputting a pressure profile for the well based on the gas-oil interface depth for each section and the oil-water interface depth for each section. The operations can include outputting the temperature profile for the well based on the gas-oil interface depth for each section and the oil-water interface depth for each section.

EXAMPLE #3

The system of any of Examples #1-2 may feature the memory further including instructions executable by the processing device for causing the processing device to perform operations for each section of the plurality of sections. The operations can include determining an estimated oil-water interface depth. The operations can include determining an estimated gas-oil interface depth. The operations can include determining a calculated water-oil ratio based on the estimated oil-water interface depth and the gas-oil interface depth. The operations can include comparing the calculated water-oil ratio to a known water-oil ratio. The operations can include, in response to determining the calculated water-oil ratio does not match the known water-oil ratio, adjusting the estimated gas-oil interface depth.

EXAMPLE #4

The system of any of Examples #1-3 may feature the memory further including instructions executable by the processing device for causing the processing device to perform operations to adjust the estimated gas-oil interface depth. The operations can include determining the calculated water-oil ratio exceeds the known water-oil ratio. The operations can include adjusting the estimated gas-oil interface depth to increase a liquid phase oil interval length of the section.

EXAMPLE #5

The system of any of Examples #1-4 may feature the memory further including instructions executable by the processing device for causing the processing device to perform operations to determine the oil-water interface depth in response to determining the calculated water-oil ratio matches the known water-oil ratio. The operations can include determining a calculated gas-oil ratio based on the estimated gas-oil interface depth and the estimated oil-water interface depth. The operations can include comparing the calculated gas-oil ratio to a known gas-oil ratio. The operations can include, in response to determining the calculated gas-oil ratio does not match the known gas-oil ratio, adjusting the estimated oil-water interface depth.

EXAMPLE #6

The system of any of Examples #1-5 may feature the memory further including instructions executable by the processing device for causing the processing device to perform operations to adjust the estimated oil-water interface depth. The operations can include determining the calculated gas-oil ratio exceeds the known gas-oil ratio. The operations can include adjusting the estimated oil-water interface depth to increase an oil interval length of the section.

EXAMPLE #7

The system of any of Examples #1-6 may feature the memory further including instructions executable by the processing device for causing the processing device to perform operations. The operations can include determining a pressure profile for the well based on the gas-oil interface depth for each section and the oil-water interface depth for each section. The operations can include performing a stress analysis for the well based on the pressure profile.

EXAMPLE #8

The system of any of Examples #1-7 may feature the memory further including instructions executable by the processing device for causing the processing device to virtually divide the well into the plurality of sections subsequent to a shut-in operation of the well.

EXAMPLE #9

The system of any of Examples #1-8 may feature the specification of the wellbore operation comprising a tubing specification or a positioning of a pump in the well for the wellbore operation.

EXAMPLE #10

A method can include determining, by a processing device, a temperature profile based on a prior production temperature profile and a reference start point pressure for a well. The method can include virtually dividing, by the processing device, the well into a plurality of sections including uphill sections and downhill sections. The method can include determining, by the processing device, a gas-oil interface depth for each section of the plurality of sections from a water-oil ratio and a gas-oil ratio based on the temperature profile and the reference start point pressure. The method can include determining, by the processing device, an oil-water interface depth for each section of the plurality of sections from the gas-oil ratio and the water-oil ratio based on the temperature profile and the reference start point pressure.

EXAMPLE #11

The method of Example #10 can include outputting, by the processing device, the gas-oil interface depth for each section and the oil-water interface depth for each section to determine a specification for a wellbore operation. The method can include outputting, by the processing device, a pressure profile for the well based on the gas-oil interface depth for each section and the oil-water interface depth for each section. The method can include outputting, by the processing device, the temperature profile for the well based on the gas-oil interface depth for each section and the oil-water interface depth for each section.

EXAMPLE #12

The method of any of Examples #10-11 may feature determining the gas-oil interface depth for each section of the plurality of sections. The method can include determining, by the processing device, an estimated oil-water interface depth. The method can include determining, by the processing device, an estimated gas-oil interface depth. The method can include determining, by the processing device, a calculated water-oil ratio based on the estimated oil-water interface depth and the gas-oil interface depth. The method can include comparing, by the processing device, the calculated water-oil ratio to a known water-oil ratio. The method can include, in response to determining the calculated water-oil ratio does not match the known water-oil ratio, adjusting, by the processing device, the estimated gas-oil interface depth.

EXAMPLE #13

The method of any of Examples #10-12 may feature adjusting the estimated gas-oil interface depth. The method can include determining, by the processing device, the calculated water-oil ratio exceeds the known water-oil ratio. The method can include adjusting, by the processing device, the estimated gas-oil interface depth to increase a liquid phase oil interval length of the section.

EXAMPLE #14

The method of any of Examples #10-13 may feature, in response to determining the calculated water-oil ratio matches the known water-oil ratio, determining, by the processing device, the oil-water interface depth by performing operations. The operations can include determining a calculated gas-oil ratio based on the estimated gas-oil interface depth and the estimated oil-water interface depth. The operations can include comparing the calculated gas-oil ratio to a known gas-oil ratio. The operations can include, in response to determining the calculated gas-oil ratio does not match the known gas-oil ratio, adjusting the estimated oil-water interface depth.

EXAMPLE #15

The method of any of Examples #10-14 may feature adjusting the estimated oil-water interface depth. The method can include determining, by the processing device, the calculated gas-oil ratio exceeds the known gas-oil ratio. The method can include adjusting, by the processing device, the estimated oil-water interface depth to increase an oil interval length of the section.

EXAMPLE #16

The method of any of Examples #10-15 can include determining, by the processing device, a pressure profile for the well based on the gas-oil interface depth for each section and the oil-water interface depth for each section. The method can include performing, by the processing device, a stress analysis for the well based on the pressure profile.

EXAMPLE #17

The method of any of Examples #10-16 can include virtually dividing, by the processing device, the well into the plurality of sections subsequent to a shut-in operation of the well.

EXAMPLE #18

The method of any of Examples #10-17 may feature the specification of the wellbore operation comprising a tubing specification or a positioning of a pump in the well for the wellbore operation.

EXAMPLE #19

A non-transitory computer-readable medium can include instructions that are executable by a processing device for causing the processing device to perform operations. The operations can include determining a temperature profile based on a prior production temperature profile and a reference start point pressure for a well. The operations can include virtually dividing the well into a plurality of sections including uphill sections and downhill sections. The operations can include determining a gas-oil interface depth for each section of the plurality of sections from a water-oil ratio and a gas-oil ratio based on the temperature profile and the reference start point pressure. The operations can include determining an oil-water interface depth for each section of the plurality of sections from the gas-oil ratio and the water-oil ratio based on the temperature profile and the reference start point pressure.

EXAMPLE #20

The non-transitory computer-readable medium of Example #19 may feature the memory further comprising program code that is executable by the processing device for causing the processing device to perform operations. The operations can include outputting the gas-oil interface depth for each section and the oil-water interface depth for each section to determine a specification for a wellbore operation. The operations can include outputting a pressure profile for the well based on the gas-oil interface depth for each section and the oil-water interface depth for each section. The operations can include outputting the temperature profile for the well based on the gas-oil interface depth for each section and the oil-water interface depth for each section.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a memory device that includes instructions executable by the processing device for causing the processing device to:
   determine a temperature profile based on a prior production temperature profile and a reference start point pressure for a well;
   virtually divide the well into a plurality of sections including uphill sections and downhill sections;
   determine a gas-oil interface depth for each section of the plurality of sections from a water-oil ratio and a gas-oil ratio based on the temperature profile and the reference start point pressure;
   determine an oil-water interface depth for each section of the plurality of sections from the gas-oil ratio and the water-oil ratio based on the temperature profile and the reference start point pressure;
   determine a pressure profile for the well based on the gas-oil interface depth for each section and the oil-water interface depth for each section;
   perform a stress analysis test for the well based on the pressure profile; and
   control a shut-in operation at a particular section of the plurality of sections based on the gas-oil interface depth and the oil-water interface depth.

2. The system of claim 1, wherein the memory device further includes instructions executable by the processing device for causing the processing device to:
   output the gas-oil interface depth for each section and the oil-water interface depth for each section to determine a specification for a wellbore operation;
   output a pressure profile for the well based on the gas-oil interface depth for each section and the oil-water interface depth for each section; and
   output the temperature profile for the well based on the gas-oil interface depth for each section and the oil-water interface depth for each section.

3. The system of claim 2, wherein the specification of the wellbore operation comprises a tubing specification or a positioning of a pump in the well for the wellbore operation.

4. The system of claim 1, wherein the memory device further includes instructions executable by the processing device for causing the processing device to determine the gas-oil interface depth by performing operations comprising:
   for each section of the plurality of sections:
   determining an estimated oil-water interface depth;
   determining an estimated gas-oil interface depth;
   determining a calculated water-oil ratio based on the estimated oil-water interface depth and the gas-oil interface depth;
   comparing the calculated water-oil ratio to a known water-oil ratio; and
   in response to determining the calculated water-oil ratio does not match the known water-oil ratio, adjusting the estimated gas-oil interface depth.

5. The system of claim 4, wherein the memory device further includes instructions executable by the processing device to cause the processing device to adjust the estimated gas-oil interface depth by:
   determining the calculated water-oil ratio exceeds the known water-oil ratio; and
   adjusting the estimated gas-oil interface depth to increase a liquid phase oil interval length of the section.

6. The system of claim 4, wherein the memory device further includes instructions executable by the processing device for causing the processing device to:
   in response to determining the calculated water-oil ratio matches the known water-oil ratio, determine the oil-water interface depth by performing operations comprising:
   determining a calculated gas-oil ratio based on the estimated gas-oil interface depth and the estimated oil-water interface depth;
   comparing the calculated gas-oil ratio to a known gas-oil ratio; and
   in response to determining the calculated gas-oil ratio does not match the known gas-oil ratio, adjusting the estimated oil-water interface depth.

7. The system of claim 6, wherein the memory device further includes instructions executable by the processing device to cause the processing device to adjust the estimated oil-water interface depth by:
   determining the calculated gas-oil ratio exceeds the known gas-oil ratio; and
   adjusting the estimated oil-water interface depth to increase an oil interval length of the section.

8. The system of claim 1, wherein the memory device further includes instructions that are executable by the processing device for causing the processing device to virtually divide the well into the plurality of sections subsequent to a shut-in operation of the well.

9. A method comprising:
  determining, by a processing device, a temperature profile based on a prior production temperature profile and a reference start point pressure for a well;
  virtually dividing, by the processing device, the well into a plurality of sections including uphill sections and downhill sections;
  determining, by the processing device, a gas-oil interface depth for each section of the plurality of sections from a water-oil ratio and a gas-oil ratio based on the temperature profile and the reference start point pressure;
  determining, by the processing device, an oil-water interface depth for each section of the plurality of sections from the gas-oil ratio and the water-oil ratio based on the temperature profile and the reference start point pressure;
  determining, by the processing device, a pressure profile for the well based on the gas-oil interface depth for each section and the oil-water interface depth for each section;
  performing, by the processing device, a stress analysis test for the well based on the pressure profile; and
  controlling, by the processing device, a shut-in operation at a particular section of the plurality of sections based on the gas-oil interface depth and the oil-water interface depth.

10. The method of claim 9, further comprising:
  outputting, by the processing device, the gas-oil interface depth for each section and the oil-water interface depth for each section to determine a specification for a wellbore operation;
  outputting, by the processing device, a pressure profile for the well based on the gas-oil interface depth for each section and the oil-water interface depth for each section; and
  outputting, by the processing device, the temperature profile for the well based on the gas-oil interface depth for each section and the oil-water interface depth for each section.

11. The method of claim 10, wherein the specification of the wellbore operation comprises a tubing specification or a positioning of a pump in the well for the wellbore operation.

12. The method of claim 9, wherein determining the gas-oil interface depth comprises:
  for each section of the plurality of sections:
    determining, by the processing device, an estimated oil-water interface depth;
    determining, by the processing device, an estimated gas-oil interface depth;
    determining, by the processing device, a calculated water-oil ratio based on the estimated oil-water interface depth and the gas-oil interface depth;
    comparing, by the processing device, the calculated water-oil ratio to a known water-oil ratio; and
    in response to determining the calculated water-oil ratio does not match the known water-oil ratio, adjusting, by the processing device, the estimated gas-oil interface depth.

13. The method of claim 12, wherein adjusting the estimated gas-oil interface depth comprises:
  determining, by the processing device, the calculated water-oil ratio exceeds the known water-oil ratio; and
  adjusting, by the processing device, the estimated gas-oil interface depth to increase a liquid phase oil interval length of the section.

14. The method of claim 12, further comprising:
  in response to determining the calculated water-oil ratio matches the known water-oil ratio, determining, by the processing device, the oil-water interface depth by performing operations comprising:
    determining a calculated gas-oil ratio based on the estimated gas-oil interface depth and the estimated oil-water interface depth;
    comparing the calculated gas-oil ratio to a known gas-oil ratio; and
    in response to determining the calculated gas-oil ratio does not match the known gas-oil ratio, adjusting the estimated oil-water interface depth.

15. The method of claim 14, wherein adjusting the estimated oil-water interface depth comprises:
  determining, by the processing device, the calculated gas-oil ratio exceeds the known gas-oil ratio; and
  adjusting, by the processing device, the estimated oil-water interface depth to increase an oil interval length of the section.

16. The method of claim 9, further comprising virtually dividing, by the processing device, the well into the plurality of sections subsequent to a shut-in operation of the well.

17. A non-transitory computer-readable medium comprising program code that is executable by a processing device for causing the processing device to:
  determine a temperature profile based on a prior production temperature profile and a reference start point pressure for a well;
  virtually divide the well into a plurality of sections including uphill sections and downhill sections;
  determine a gas-oil interface depth for each section of the plurality of sections from a water-oil ratio and a gas-oil ratio based on the temperature profile and the reference start point pressure;
  determine an oil-water interface depth for each section of the plurality of sections from the gas-oil ratio and the water-oil ratio based on the temperature profile and the reference start point pressure;
  determine a pressure profile for the well based on the gas-oil interface depth for each section and the oil-water interface depth for each section;
  perform a stress analysis test for the well based on the pressure profile; and
  control a shut-in operation at a particular section of the plurality of sections based on the gas-oil interface depth and the oil-water interface depth.

18. The non-transitory computer-readable medium of claim 17, further comprising program code that is executable by the processing device for causing the processing device to:
  output the gas-oil interface depth for each section and the oil-water interface depth for each section to determine a specification for a wellbore operation;
  output a pressure profile for the well based on the gas-oil interface depth for each section and the oil-water interface depth for each section; and
  output the temperature profile for the well based on the gas-oil interface depth for each section and the oil-water interface depth for each section.

19. The non-transitory computer-readable medium of claim 17, further comprising program code that is executable by the processing device for causing the processing device to determine the gas-oil interface depth by:

for each section of the plurality of sections:
    determining an estimated oil-water interface depth;
    determining an estimated gas-oil interface depth;
    determining a calculated water-oil ratio based on the estimated oil-water interface depth and the gas-oil interface depth;
    comparing the calculated water-oil ratio to a known water-oil ratio; and
    in response to determining the calculated water-oil ratio does not match the known water-oil ratio, adjusting the estimated gas-oil interface depth.

20. The non-transitory computer-readable medium of claim 19, further comprising program code that is executable by the processing device for causing the processing device to adjust the estimated gas-oil interface depth by:
    determining the calculated water-oil ratio exceeds the known water-oil ratio; and
    adjusting the estimated gas-oil interface depth to increase a liquid phase oil interval length of the section.

* * * * *